(12) United States Patent
Massey et al.

(10) Patent No.: US 6,460,212 B2
(45) Date of Patent: Oct. 8, 2002

(54) DOCK LEVELER HAVING AN INFLATABLE MEMBER

(75) Inventors: Douglas H. Massey, New Berlin, WI (US); Charles H. Hodges, Ruxton, MD (US)

(73) Assignee: Kelley Company, Inc., Milwaukee, WI (US)

( * ) Notice: Subject to any disclaimer, the term of this patent is extended or adjusted under 35 U.S.C. 154(b) by 0 days.

(21) Appl. No.: 10/005,395

(22) Filed: Dec. 3, 2001

(65) Prior Publication Data

US 2002/0035760 A1 Mar. 28, 2002

Related U.S. Application Data

(63) Continuation of application No. 09/613,224, filed on Jul. 10, 2000, now abandoned, which is a continuation of application No. 09/456,207, filed on Dec. 7, 1999, now abandoned, which is a continuation of application No. 09/093,234, filed on Jun. 8, 1998, now Pat. No. 5,996,156, which is a continuation of application No. 08/798,566, filed on Feb. 11, 1997, now abandoned, which is a continuation-in-part of application No. 08/531,011, filed on Sep. 20, 1995, now Pat. No. 5,802,650, which is a continuation-in-part of application No. 08/380,956, filed on Jan. 31, 1995, now Pat. No. 5,600,859, and a continuation-in-part of application No. 08/131,983, filed on Oct. 4, 1993, now Pat. No. 5,471,693.

(51) Int. Cl.$^7$ ............................................. E01D 1/00
(52) U.S. Cl. ........................ 14/71.3; 14/69.5; 14/71.1
(58) Field of Search ............................ 14/69.5, 71.1, 14/71.3, 71.7

(56) References Cited

U.S. PATENT DOCUMENTS 2,070,960 A 2/1937 Phillips
2,495,092 A 1/1950 Cox et al.

(List continued on next page.)

FOREIGN PATENT DOCUMENTS

| DE | 2354388 | 3/1974 |
|---|---|---|
| DE | 27 21 384 A1 | 11/1978 |
| DE | 37 43 551 A1 | 7/1989 |
| EP | 0 001 316 | 4/1979 |
| EP | 0 386 850 | 12/1990 |
| GB | 835 142 | 5/1960 |
| GB | 930163 | 7/1963 |
| GB | 2 145 041 A | 3/1985 |
| GB | 2 206 158 A | 12/1988 |
| SU | 161243 | 7/1964 |
| SU | 931701 | 5/1982 |
| SU | 1362826 A1 | 12/1987 |
| WO | WO 9011204 | 10/1990 |
| WO | WO 93/13267 | 7/1993 |

OTHER PUBLICATIONS

Rite–Hite Semi–Automatic Dock Leveler, Specifications and Pit Details—2 pages.

*Primary Examiner*—Gary S. Hartmann
(74) *Attorney, Agent, or Firm*—Michael Best & Friedrich LLP

(57) ABSTRACT

A dock leveler including a ramp having a rear edge movably interconnected with a loading dock and an inflatable assembly positioned to cause movement of the ramp inflation of the inflatable assembly. There is a support positioned under the inflatable assembly. The support is movably coupled to the ramp.

10 Claims, 8 Drawing Sheets

U.S. PATENT DOCUMENTS

| | | |
|---|---|---|
| 2,610,824 A | 9/1952 | Grier |
| 2,689,956 A | 9/1954 | Fenton |
| 2,804,114 A | 8/1957 | Bayerkohler |
| 2,846,703 A | 8/1958 | Adley |
| 3,012,804 A | 12/1961 | Jeavons |
| 3,117,332 A | 1/1964 | Kelley et al. |
| 3,211,425 A | 10/1965 | Greulich et al. |
| 3,379,411 A | 4/1968 | Vanderjagt |
| 3,521,861 A | 7/1970 | Freudenthal et al. |
| 3,528,118 A | 9/1970 | Smith |
| 3,628,487 A | 12/1971 | Bennett |
| 3,659,899 A | 5/1972 | Phillips et al. |
| 3,685,077 A | 8/1972 | Wiener et al. |
| 3,711,157 A | 1/1973 | Smock |
| 3,763,514 A | 10/1973 | Bishop |
| 3,784,255 A | 1/1974 | Smock |
| 3,799,504 A | 3/1974 | Vaughen |
| 3,835,497 A | 9/1974 | Smith |
| 3,977,349 A | 8/1976 | Hummel |
| 3,997,932 A | 12/1976 | Artzberger |
| 4,012,804 A | 3/1977 | Catlett |
| 4,036,472 A | 7/1977 | Orndorff, Jr. |
| 4,060,170 A | 11/1977 | Walters |
| 4,061,310 A | 12/1977 | Vetter |
| 4,081,874 A | 4/1978 | Artzberger |
| 4,149,469 A | 4/1979 | Bigler |
| 4,169,296 A | 10/1979 | Wipkink et al. |
| 4,293,969 A | 10/1981 | Frommelt |
| 4,319,666 A | 3/1982 | Hunter |
| 4,343,058 A | 8/1982 | Loblick |
| 4,455,703 A | 6/1984 | Fromme et al. |
| 4,538,311 A | 9/1985 | Hall et al. |
| 4,572,579 A | 2/1986 | Saito |
| 4,629,162 A | 12/1986 | Porche |
| 4,665,579 A | 5/1987 | Bennett et al. |
| 4,688,760 A | 8/1987 | Garman et al. |
| 4,735,457 A | 4/1988 | Bonerb et al. |
| 4,776,052 A | 10/1988 | Delgado et al. |
| 4,782,542 A | 11/1988 | Sato |
| 4,786,032 A | 11/1988 | Garman et al. |
| 4,861,215 A | 8/1989 | Bonerb |
| 4,922,568 A | 5/1990 | Hageman |
| 4,937,906 A | 7/1990 | Alexander |
| 4,948,107 A | 8/1990 | Orndorff, Jr. |
| 4,955,923 A | 9/1990 | Hageman |
| 5,042,103 A | 8/1991 | Megens |
| 5,067,774 A | 11/1991 | Trwoland |
| 5,088,143 A | 2/1992 | Alexander |
| 5,178,367 A | 1/1993 | Vaughen |
| 5,232,202 A | 8/1993 | Watson |
| 5,414,886 A | 5/1995 | Sust et al. |
| 5,446,938 A | 9/1995 | Warner et al. |
| 5,450,643 A | 9/1995 | Warner |
| 5,471,693 A | 12/1995 | Hodges |
| 5,475,888 A | 12/1995 | Massey |
| 5,481,774 A | 1/1996 | Hodges et al. |
| 5,500,968 A | 3/1996 | Hodges |
| 5,522,107 A | 6/1996 | Hageman et al. |
| 5,522,108 A | 6/1996 | Massey et al. |
| 5,600,859 A | 2/1997 | Hodges et al. |
| 5,669,086 A | 9/1997 | German |
| 5,802,650 A | 9/1998 | Massey |
| 5,802,651 A * | 9/1998 | Massey et al. ............... 14/71.3 |
| 5,996,156 A * | 12/1999 | Massey ..................... 14/71.3 |
| 6,216,303 B1 * | 4/2001 | Massey ..................... 14/69.5 |

* cited by examiner

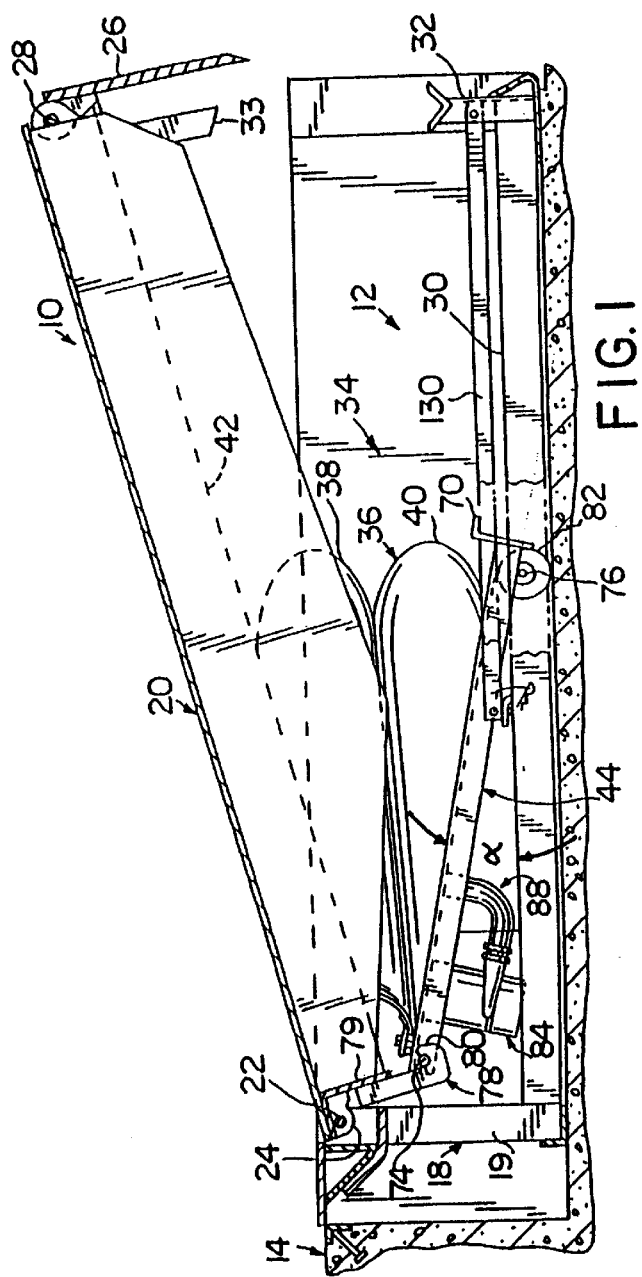

DOCK LEVELER HAVING AN INFLATABLE MEMBER

REFERENCE TO RELATED APPLICATIONS

This application is a continuation of U.S. patent application Ser. No. 09/613,224 filed Jul. 10, 2000, now abandoned, which is a continuation of U.S. patent application Ser. No. 09/456,207 filed Dec. 7, 1999, now abandoned, which is a continuation of U.S. patent application Ser. No. 09/093,234 filed Jun. 8, 1998, now U.S. Pat. No. 5,996,156, which is a continuation of U.S. patent application Ser. No. 08/798,566 filed Feb. 11, 1997, now abandoned, which is a continuation-in-part of U.S. patent application Ser. No. 08/531,011 filed Sep. 20, 1995, now U.S. Pat. No. 5,802,650, which is a continuation-in-part of both U.S. patent application Ser. No. 08/380,956 filed Jan. 31, 1995, now U.S. Pat. No. 5,600,859, and U.S. patent application Ser. No. 08/131,983 filed Oct. 4, 1993, now U.S. Pat. No. 5,471,693, all of which are incorporated herein by reference in their entirety.

BACKGROUND OF THE INVENTION

This invention relates to a dock leveler used to bridge the gap between a loading dock and the bed of a truck or carrier parked adjacent the loading dock, and more particularly to improvements in dock levelers incorporating an airbag or other inflatable member for raising the ramp of the dock leveler.

A dock leveler typically includes a frame or supporting structure mounted in a pit or depression in the loading dock. The rear end of a ramp or deck plate is pivotally mounted to the supporting structure so that the ramp is movable between an inclined position in which the ramp is supported by the truck bed, a horizontal inoperative position, and a raised position in which the forward end of the ramp is raised above the truck bed.

An extension lip is pivotally mounted to the forward end of the ramp, and is movable between a downwardly hanging pendant position and an extended position in which the lip forms an extension to the ramp.

After a truck has parked in front of the loading dock in preparation for a loading or unloading operation, the ramp of the dock leveler is raised to its upwardly inclined position. As the ramp is lowered, the lip is pivoted outwardly to its extended position. As the ramp is subsequently lowered, the lip engages the bed of the truck to support the ramp, such that the ramp and the lip in combination bridge the gap between the loading dock and the truck bed. After the loading or unloading operation is completed, the ramp is raised and the lip falls by gravity to its pendant position. The ramp is then lowered to its horizontal position, and the truck can then pull away from the loading dock.

In the past, the ramp has been pivoted to its upward position in response to operation of a mechanical or hydraulic mechanism. However, recent developments in the dock leveler art disclose an inflatable member or bag utilized to pivot the ramp to its upwardly inclined position. These applications disclose a bag inflated with low pressure air by an inflating device such as a fan or blower, and are hereby incorporated by reference in their entirety.

It has been found that certain problems can occur when incorporating an inflatable member into a dock leveler. For example, if the inflatable bag directly interconnects the floor of the pit with the pivoting ramp, the bag can sometimes tear away from its interconnection with the ramp. Further the long distance between the pit floor and the ramp can cause lateral instability of the bag assembly.

SUMMARY OF THE INVENTION

The present invention relates to improvements to the above-noted dock levelers incorporating an inflatable member. In one aspect, the dock leveler of the present invention is adapted to be mounted to a loading dock, and includes a ramp having a rear edge movably interconnected with the loading dock, an intermediate member movable relative to the ramp, and an inflatable assembly (e.g., one or more inflatable bags) positioned to cause relative movement between the ramp and the intermediate member to thereby result in movement of the ramp relative to the loading dock. The utilization of an intermediate member has been found to improve the dock leveler by maintaining the ends of the inflatable assembly in a closer, more controlled area.

In one embodiment, the loading dock includes a pit having a pit floor. The intermediate member can be movably (e.g., pivotally) mounted to either a pit floor, the ramp, or some other location on the loading dock. In another embodiment, the dock leveler further includes a linkage member interconnecting the intermediate member with the ramp. In yet another embodiment, a roller member is mounted to an end of the intermediate member. The inflatable assembly can include either a blower device or a vacuum device.

In another aspect, the present invention is embodied in a dock leveler including a ramp having a rear edge movably interconnected with the loading dock, an inflatable assembly operatively interconnected with the ramp, and a vacuum device operatively associated with the inflatable assembly for selectively removing gas from the inflatable assembly to cause movement of the ramp. The vacuum device can be mounted to a vacuum support (e.g., rigidly secured to the loading dock), and an intermediate member movably mounted relative to the vacuum support. In this embodiment, the inflatable assembly can be operatively positioned between the vacuum support and the intermediate member.

The present invention is also embodied in a method of operating a dock leveler having a pivotally-mounted ramp, an intermediate member movable relative to the ramp, and an inflatable assembly positioned to cause relative movement between the ramp and the intermediate member upon inflation of the inflatable member. The method includes the steps of inflating the inflatable member, and moving (e.g., pivoting) the intermediate member relative to the ramp to thereby pivot (e.g., raise or lower) the ramp. Movement of an intermediate member to cause movement of the ramp has been found to improve the dock leveler by maintaining the ends of the inflatable assembly in a closer, more controlled area.

In one embodiment, the dock leveler further includes a linkage member interconnecting the intermediate member with the ramp, and the step of moving the intermediate member includes the step of moving the linkage member. In another embodiment, the dock leveler further includes a roller member mounted to an end of the intermediate member, and the step of moving the intermediate member includes the step of rotating the roller member.

Other features and advantages of the invention will become apparent to those skilled in the art upon review of the following detailed description, claims, and drawings.

BRIEF DESCRIPTION OF THE DRAWINGS

FIG. 1 is a longitudinal section view of a dock leveler constructed according to the invention, illustrating the ramp in its upwardly inclined raised position.

FIG. 2 is a partial section view of the dock leveler of FIG. 1, with portions broken away, showing a portion of the inflatable member, the support and the inflating device subassembly.

Figure 4:
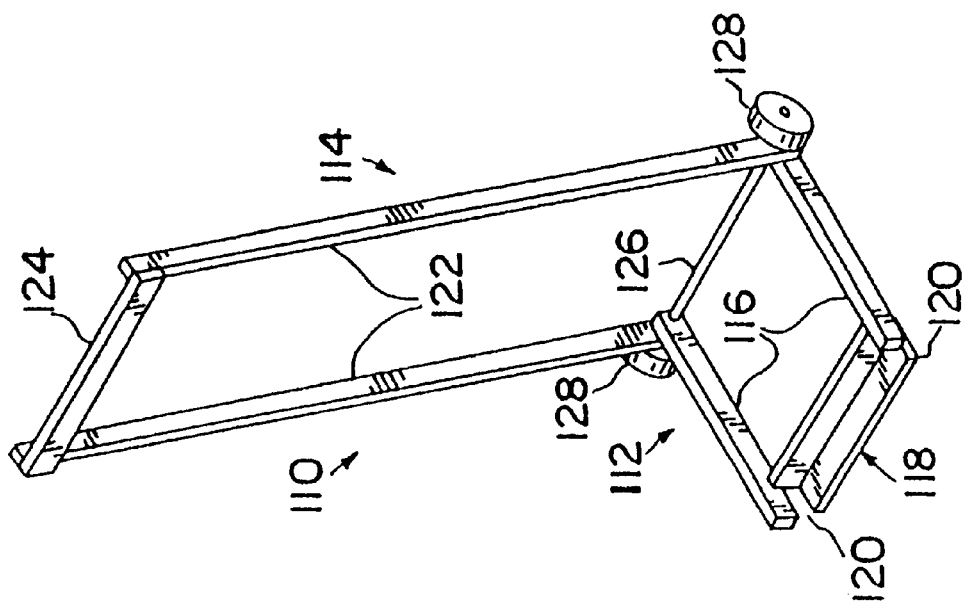
FIG. 4 is an isometric view of a lifting tool for raising the forward end of the lifting device support above the supporting surface to a raised position.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Referring to FIG. 1, a dock leveler 10 is mounted in a pit or depression 12 in a loading dock 14. The lower surface or floor 16 of pit 12 preferably slopes downwardly and forwardly, in a conventional manner. Dock leveler 10 is adapted to bridge the gap between the upper surface of loading dock 14 and the bed of a truck or carrier parked in front of loading dock 14, to facilitate loading or unloading of the truck or carrier.

Figure 15:
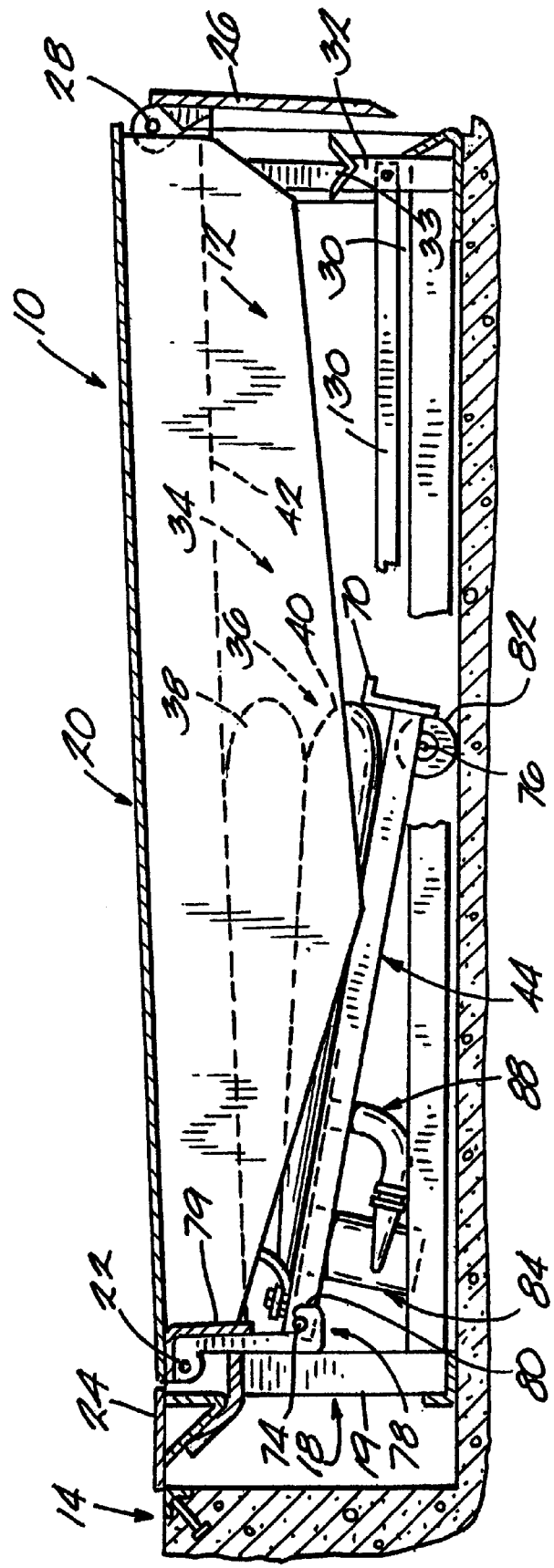
FIG. 15 is a longitudinal section view of the dock leveler shown in FIG. 1, illustrating the ramp in the lowered position.

Dock leveler 10 includes a frame or supporting structure 18, which is mounted in pit 12, and the rear end of a ramp or deck plate 20 is pivotally mounted to the upper end of frame 18 via one or more pins 22, again in a conventional manner. Ramp 20 is movable between a generally horizontal stored, dock-level position, in which ramp 20 is flush and substantially co-planar with the upper surface of dock 14, as shown in FIG. 15, and an upwardly inclined position, as shown in FIG. 1.

To pivotally mount ramp 20 to frame 18, a series of lugs 24, interconnected with ramp 20, are mounted to the upper ends of the vertical members 19 of frame 18 through pins 22.

An extension lip 26 is hinged to the forward end of ramp 20 by means of hinge pins 28. Extension lip 26 is pivotable from a downwardly hanging pendant position, as illustrated in FIG. 1, to an outwardly extending position (not shown), via a conventional lip extension mechanism which is actuated when ramp 20 is moved from its raised position to a lowered position. When lip 26 is moved to its outwardly extending position, lip 26 is co-planar with ramp 20, forming an extension to ramp 20. Lip 26 can be moved from its pendant position to its extended position and held in its extended position by various mechanical, hydraulic or pneumatic mechanisms, in a manner as is known, and the lip lifting and latching mechanism is not, in itself, a part of the present invention.

Frame 18 further includes a pair of spaced, forwardly-extending side members 30 located adjacent the sides of pit 12, and a pair of front support pads 32 mounted to the forward ends of side members 30. The support pads 32 are designed to support dock level supports 33. Side members 30 are preferably in the form of angle members, each defining an outer vertical section and lower horizontal sections spaced slightly above pit floor 16. A lifting subassembly, shown generally at 34, is located in pit 12 beneath ramp 20. Lifting subassembly 34 consists of an inflatable member or bag assembly 36 including vertically superimposed upper and lower bags 38, 40, respectively. The construction of bag assembly 36 is illustrated and described in co-pending U.S. patent application Ser. No. 08/131,981 filed Oct. 4, 1993, now U.S. Pat. No. 5,446,938. The bags 38, 40 are preferably formed of any satisfactory air-impervious material, such as fabric coated with a thermoplastic resin, and have contiguous horizontal surfaces joined together via an annular seal enclosing an opening providing communication between bags 38, 40. It should be appreciated that one or more bags could be used.

The upper surface of bag assembly 36, defined by the upper extent of upper bag 38, bears against a pressure plate (not shown) mounted to the undersides of a series of longitudinally extending beams 42, to which ramp 20 is mounted.

Figure 3:
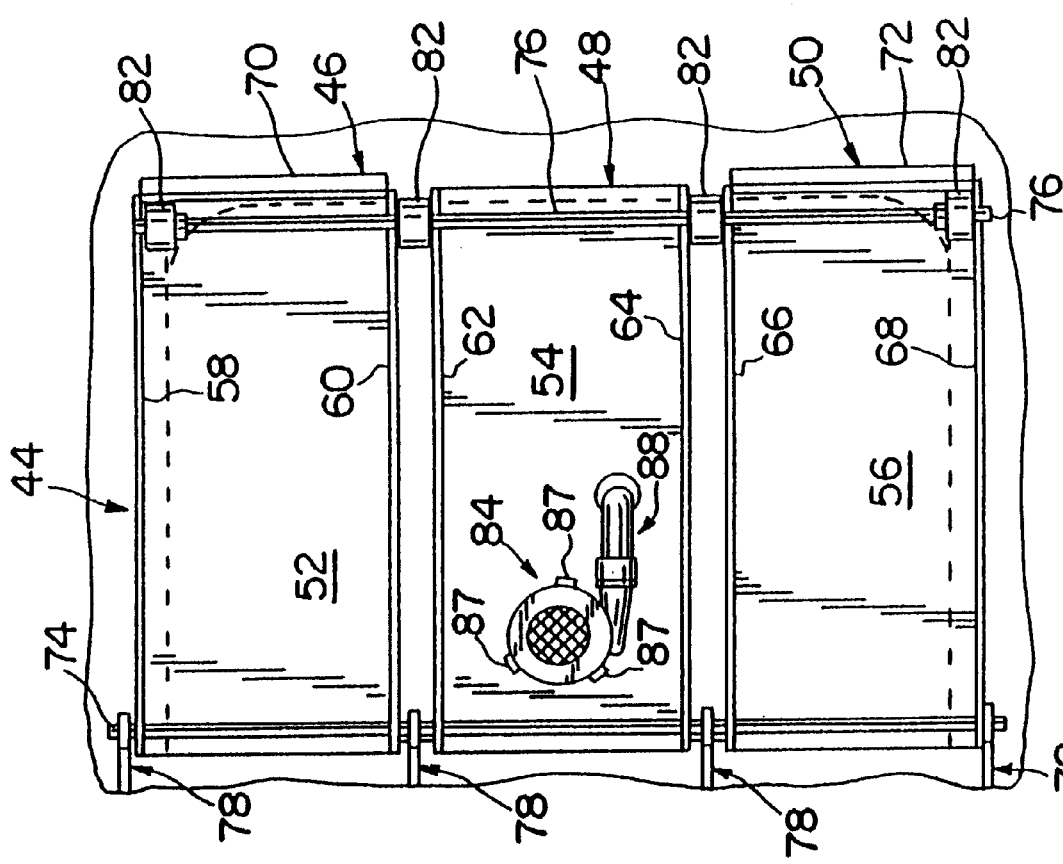
FIG. 3 is a bottom plan view of the subassembly illustrated in FIG. 2.

Bag assembly 36 is mounted to a bag support assembly 44 (FIGS. 1 and 3), which as shown consists of three side-by-side sections 46, 48 and 50 (FIG. 3). Sections 46, 48 and 50 include upper support plates 52, 54 and 56, respectively, which have downturned side flanges 58, 60; 62, 64; and 66, 68, respectively. Front bumpers 70, 72, in the form of inverted L-shaped sections, are mounted to the forward ends of support sections 46 and 50.

A pin 74 extends through aligned openings located adjacent the rearward ends of flanges 58–68, and an axle 76 extends through aligned openings located toward the forward ends of flanges 58–68. Pin 74 and axle 76 function to secure support sections 46, 48 and 50 together.

Referring to FIGS. 1–3, pin 74 is removably engageable within upwardly facing slots formed in depending hook-type bracket members 78 mounted to a rear transverse angle member 79 located at the rearward ends of beams 42 below ramp 20. Each bracket member 78 includes an upwardly extending lip 80 at its lower, forward end defining the slot within which pin 74 is received. With this construction, the rearward end of support 44 is removable from engagement with brackets 78 via an upward movement of the rearward end of support 44.

A series of wheels 82 are mounted to axle 76. An outer pair of wheels are located adjacent flanges 58 and 68, and an inner pair of wheels 82 are located one between sections 46 and 48 adjacent flanges 60 and 62, respectively, and the other between sections 48 and 50 adjacent flanges 64 and 66, respectively. The wheels 82 are engageable with pit floor 16 so as to enable rolling movement of support 44 thereon. As shown in FIG. 1, when wheels 82 are engaged with pit floor 16 and when pin 74 is mounted within the slots in brackets 78, the rearward end of support 44 is elevated relative to the forward end. As shown in FIG. 1, the rearward end of support 44 is elevated at an angle a that is at least ten degrees from horizontal. It should be appreciated that one or more wheels could be used.

A fan or blower assembly 84 is mounted to the lower surface of one of the plates, preferably to plate 54 of central section 48. Fan assembly 84 consists of an upper housing 85a and a lower housing 85b (FIG. 2). A fan unit including a mounting ring 86 having a series of bosses 87 is secured between upper housing 85a and lower housing 85b, with the fan itself being disposed within upper housing 85a and its inlet and a filter being disposed within lower housing 85b. Fan assembly 84 is electrically operated, and includes a conventional cord engageable with an electrical outlet (not shown) for providing power to fan assembly 84.

As shown in FIG. 2, an air pipe assembly 88, consisting of a fan outlet section 90 formed integrally with ring 86, a flexible elbow 92 and a discharge section 94, is mounted between the fan assembly 84 and the interior of lower airbag 40. Fan outlet section 90 receives pressurized air from fan assembly 84, which is then transferred through elbow 92 and discharge section 94 into lower airbag 40 and subsequently into upper airbag 38.

While fan assembly 84 is shown mounted to support 44, it is understood that fan 84 could be mounted in any other location, such as between beams 42. Alternatively, it is understood that air from a pressurized, regulated air source, such as compressed shop air, could be used in place of fan assembly 84.

Referring to FIG. 2, a flexible elastomeric reinforcing ring 96 is secured, such as by heat sealing or gluing, to the lower wall 98 of lower airbag 40, and ring 96 includes a central opening overlying the inlet opening formed in airbag lower wall 98. A nipple 100 having barbs 102 is connected to the end of discharge section 94 and extends through the aligned openings formed in plate 54, bag lower wall 98 and ring 96. Barbs 102 are engageable with reinforcing ring 96 so as to securely mount bag assembly 34 to discharge pipe assembly 88.

Bag assembly 34 is secured to support sections 46,48,50 using a clamp bar 106 (FIG. 2), which is secured via bolts 108 and associated nuts to plates 52, 54 and 56, after bag reinforcing ring 96 is secured to nipple 100 using a downward push-on motion forcing ring 96 over the barbs 102 of the nipple 100.

With the construction as illustrated in FIGS. 1–3, lifting assembly 34, consisting of bag assembly 36, bag support 44 and fan assembly 84, is removable as a unit from dock leveler 10, to facilitate servicing and/or replacement of such components. This arrangement substantially simplifies construction of dock leveler 10 by enabling the airbag, support and fan subassembly to be assembled separately from the other components of dock leveler 10. Further, a very short run of piping is necessary to communicate pressurized air from fan assembly 84 to airbag assembly 36, which again simplifies manufacture and minimizes the amount of pressure loss through the piping.

The invention further contemplates a lifting tool 110 (FIG. 4) which is adapted for use in raising the forward end of airbag support 44. Lifting tool 110 includes a lower lifting section 112 and a lever or lifting handle section 114. Lower lifting section 112 includes a pair of lifting members 116 and a forward mounting member 118 in the form of an angle section mounted between the forward ends of lifting members 116. The lower flange of forward mounting member 118 is disposed in a plane parallel to the plane of the lower surfaces defined by lifting members 116 and is spaced there below, so as to define a pair of slots 120. Lever section 114 includes a pair of tube handle sections 122 connected at their upper ends via a cross-bar 124. The lower ends of tube handle sections 122 and the rearward ends of lifting members 116 are welded together. An axle 126 extends through aligned openings formed in tube handle sections 122 and lifting members 116, and wheels 128 are mounted to the ends of axle 126.

Lifting section 112 and lever section 114 cooperate to define an acute angle therebetween, preferably 70 degrees to 80 degrees.

Figure 5:
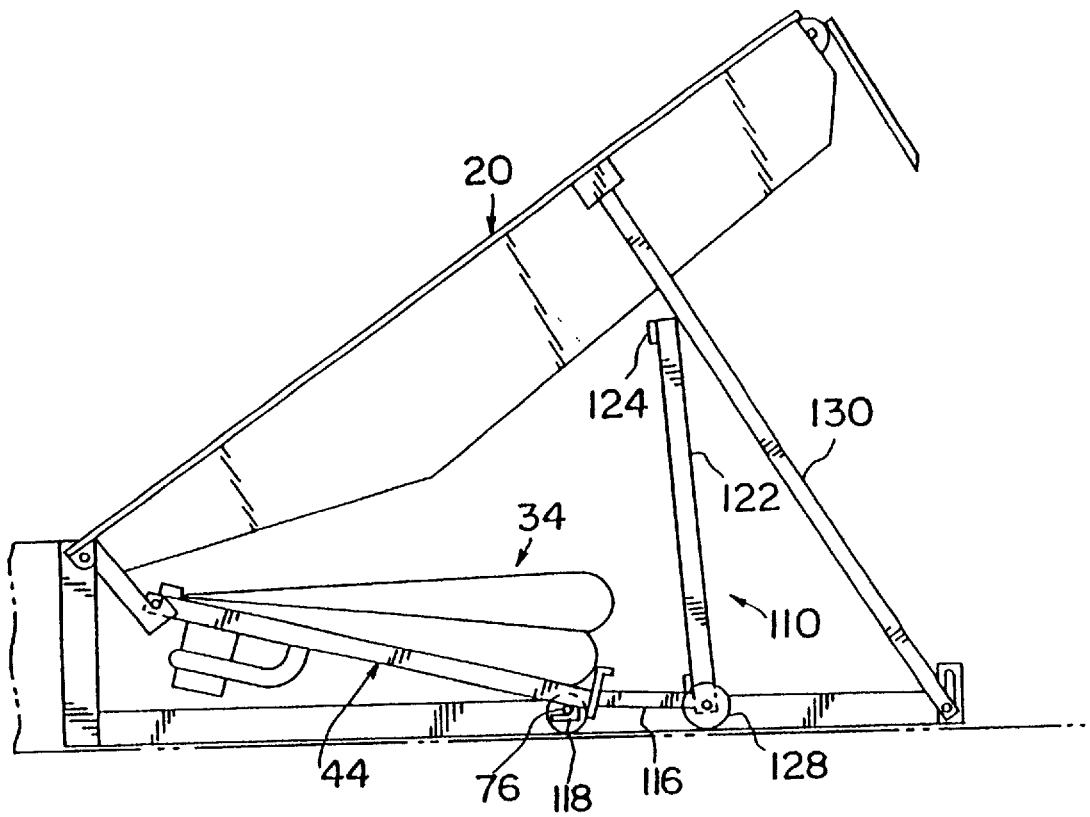
FIG. 5 is a schematic view of the dock leveler of FIG. 1 showing the lifting tool of FIG. 4 in an engaged, inoperative position.
Figure 6:
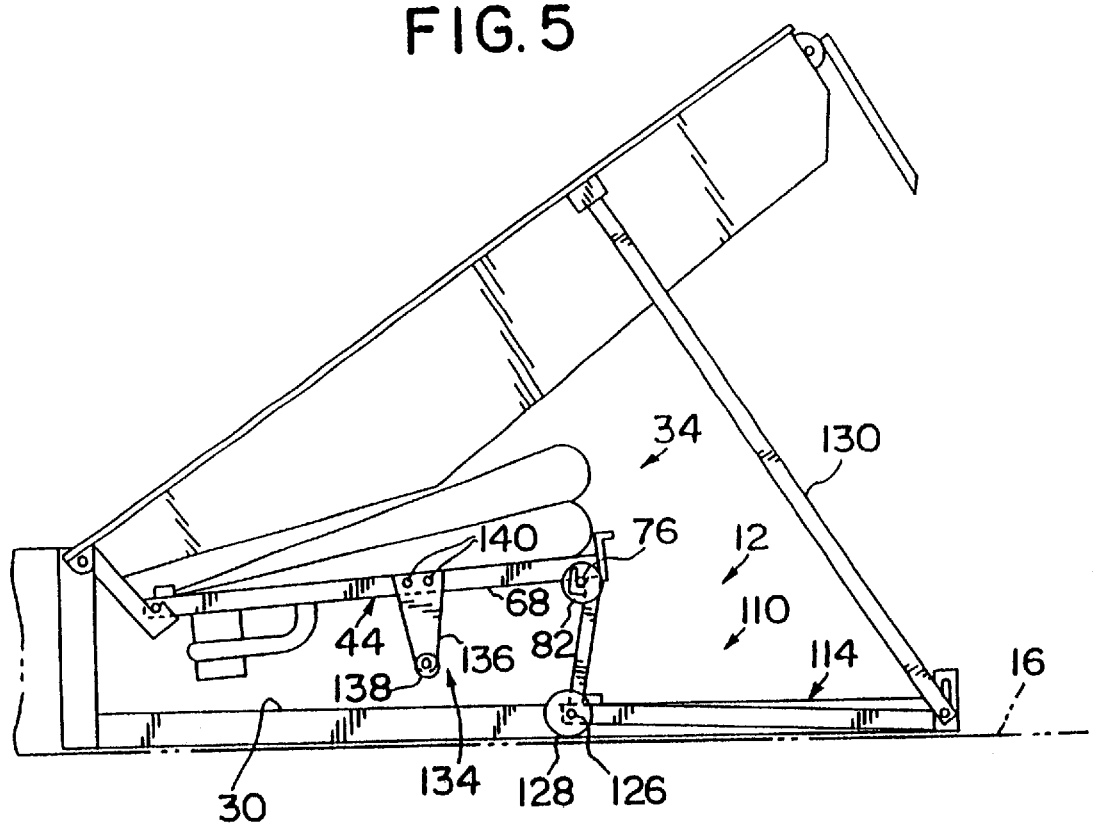
FIG. 6 is a view similar to FIG. 5, showing the lifting tool in its operative lifting position for raising the forward end of the lifting device support and showing mounting of the auxiliary wheels to the lifting device support.

Referring to FIGS. 5 and 6, lifting tool 110 is used to lift the forward end of airbag support 44 when the maintenance strut 130 of dock leveler 10 is in its operative position in which ramp 20 is raised upwardly to a maintenance position from its conventional at-rest position, in accordance with conventional operation of a maintenance strut of this type. Lifting tool 110 is moved to an engaged position in which axle 76 is received within slots 120, with the lower flange of angle 118 being located below axle 76 and the forward bottom edges of lifting members 116 being located over axle 76. While maintaining such engagement of lifting section 112 with axle 76, the user exerts a downward and rearward force on handle section 114 by grasping upper cross-bar 124 and bringing handle section 114 to its FIG. 6 position in which the upper end of handle section 114 engages pit floor 16. During such movement of handle section 114, wheels 128 roll rearwardly on pit floor 16 to the position as shown in FIG. 6, in which the axle 126, to which wheels 128 are mounted, is located rearwardly of axle 76. This movement results in lifting members 116 raising axle 76, and thereby the forward end of support 44, to a raised position as shown in FIG. 6.

The geometry of lifting tool 110, in which axle 76 is located forwardly of lifting tool axle 126 when lifting tool handle section 114 is engaged with pit floor 16, enables the operator to leave lifting tool 110 in its FIG. 6 position to maintain the front end of support 44 in its raised position. The weight of support 44, airbag assembly 34 and fan 84 exerts a downward force on wheels 128 and the forward end of handle section 114 to maintain lifting tool 110 in its operative lifting position, without assistance from the operator. The operator is then free to clean the rearward portion of pit 12 below support 44, such as by using a broom or by spraying water, or by another other satisfactory method. After use, lifting tool 110 is returned to its FIG. 5 position and removed for subsequent operation of dock leveler 10.

Figure 8:
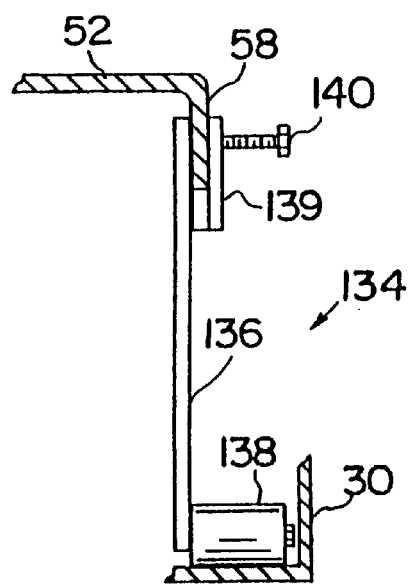
FIG. 8 is a partial section view taken along line 8—8 of FIG. 7.

Alternatively, while lifting tool 110 is in its operative lifting position of FIG. 6, and if the operator desires to remove support 44 for servicing of airbag assembly 34, fan assembly 84 or support 44, the operator mounts a pair of auxiliary wheel assemblies 134 to flanges 58 and 68. Each auxiliary wheel assembly 134 consists of a mounting plate 136 having a wheel 138 rotatably mounted to its lower end, and having an upper clamping plate 139 mounted to its upper end. Clamping plate 139 includes a threaded opening which receives the threaded shank of a bolt 140 (FIG. 8). Bolt 140 engages flange 58 of support 52 to clamp flange 58 between the end of bolt 140 and the upper end of mounting plate 136. In this manner, auxiliary wheel assemblies 134 are temporarily secured to flanges 58, 68.

Mounting plate 136 of each auxiliary wheel assembly 134 is constructed such that each auxiliary wheel 138 is located at an elevation below that of support wheels 82 when auxiliary wheel assemblies 134 are mounted to support 44. In this manner, when lifting tool 110 is moved from its operative lifting position of FIG. 6 back toward its engaging position of FIG. 5, auxiliary wheels 138 engage a rolling surface, which in this case is the lower flange of frame side members 30, and support wheels 82 are located above pit floor 16 and frame side members 30. Alternatively, it is understood that auxiliary wheels 138 may be constructed so as to engage pit floor 16.

Figure 7:
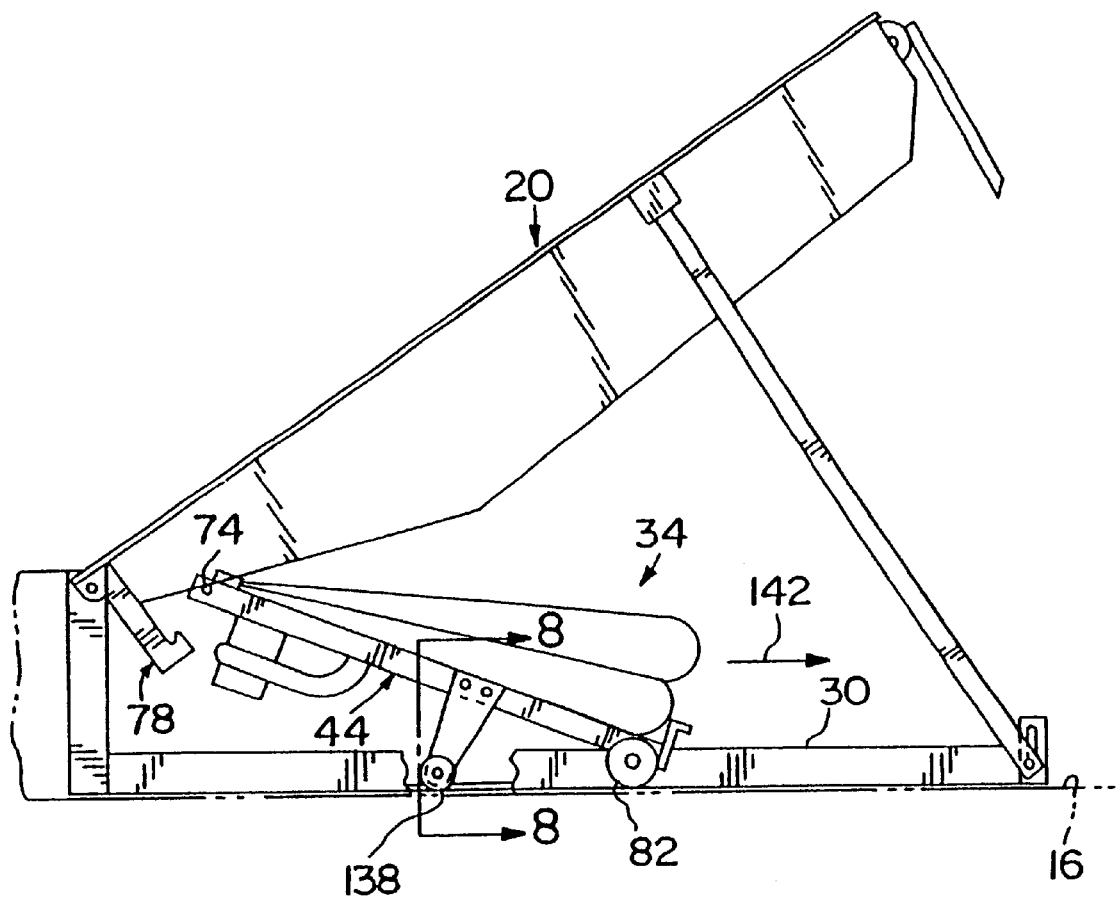
FIG. 7 is a view similar to FIGS. 5 and 6, showing removal of the lifting device support, the inflatable member and the inflating device using the auxiliary wheels mounted to the support.

The user then removes lifting tool 110, and exerts a downward force on the forward end of support 44 to pivot the rear end of support assembly 44 upwardly, as shown in FIG. 7, while maintaining engagement of auxiliary wheels 138 with frame side members 30. This downward movement of the forward end of support 44 and raising of the rearward end of support 44 disengages pin 74 from the slot in brackets 78. Engagement between dock leveler 10 and lifting subassembly 34 is then released, and the operator exerts a forward force in the direction of arrow 142 (FIG. 7) cause auxiliary wheels 138 to ride on frame side members 30 to withdraw subassembly 34 forwardly from below ramp 20. After the subassembly 34 has been serviced as required or if pit 12 has been serviced as necessary upon removal of subassembly 34, subassembly 34 is replaced by reversing the above steps. That is, subassembly 34 is moved rearwardly while maintaining auxiliary wheels 138 in engagement with frame side members 30, until pin 74 engages the forward surfaces of brackets 78. The operator then employs lifting tool 110 to raise the forward end of support 44 as shown in FIG. 6, wherein pin 74 rides on the forward surfaces of brackets 78 until pin 74 is received within the slot formed in brackets 78. While support 44 is in its raised position, auxiliary wheel assemblies 134 are removed from support 44, and lifting tool 110 is thereafter moved back to its FIG. 5 position and then withdrawn from below ramp 20. Ramp 20 is then once again moved to its raised position by operation of fan 84, and maintenance strut 130 is then replaced to its inoperative position as shown in FIG. 1. Dock leveler 10 is then again ready for operation.

It is understood that lifting tool 110 and auxiliary wheel assemblies 134 could be employed in connection with any type of lifting device support, and are not limited to use in connection with an airbag-type lifting arrangement. It is also understood that lifting tool 110 and auxiliary wheel assemblies 134 could be employed in an airbag-operated dock leveler in which fan 84 is in a location other than mounted to support 44.

Figure 9:
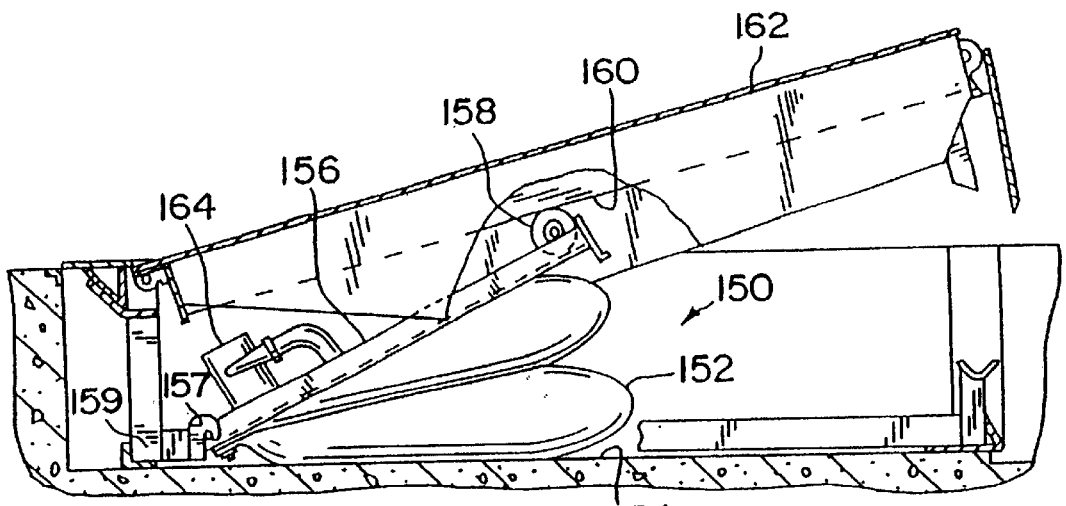
FIGS. 9–11 are longitudinal section views of alternative embodiments of the lifting subassembly of the present invention.

FIG. 9 illustrates an alternative embodiment of the lifting subassembly 34 illustrated in FIG. 1. The lifting subassembly 150 includes a bag assembly 152 positioned directly on the pit floor 154. An intermediate member 156 is pivotally and removably interconnected with the pit floor 154 at brackets 157 which are mounted to the subframe 159. One or more rollers 158 are mounted on one end of the intermediate member 156 to provide rolling contact between the intermediate member 156 and the bottom surface 160 of the longitudinal beams 160 to which the deck plate 162 is secured. In operation, the bag assembly 152 is selectively inflated and deflated by a blower device 164 to selectively pivot the intermediate member 156 upward and downward, respectively. Such upward and downward movement of the intermediate member 156 results in raising and lowering of the deck plate 162. As used herein, "inflate" and "deflate" are relative terms and should not be interpreted as requiring that the bag assembly be completely inflated and completely deflated, respectively.

Figure 10:
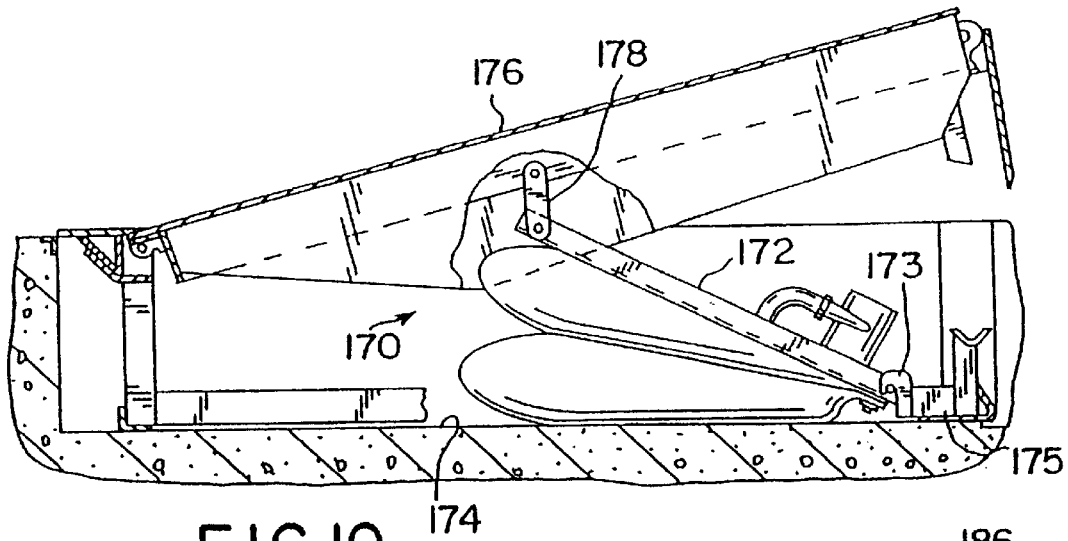

FIG. 10 illustrates another embodiment of the lifting subassembly. The lifting subassembly 170 illustrated in FIG. 10 is similar to that illustrated in FIG. 9, except that the intermediate member 172 is pivotally mounted to brackets 173 that are mounted to the subframe 175 near a front portion of the pit floor 174 rather than near a rear portion. In this manner, the intermediate member 172 pivots clockwise to cause counter clockwise motion to the deck plate 176. In addition, rather than utilizing a roller, the apparatus illustrated in FIG. 10 utilizes one or more links 178 to accommodate relative movement between the intermediate member 172 and the deck plate 176.

Figure 11:
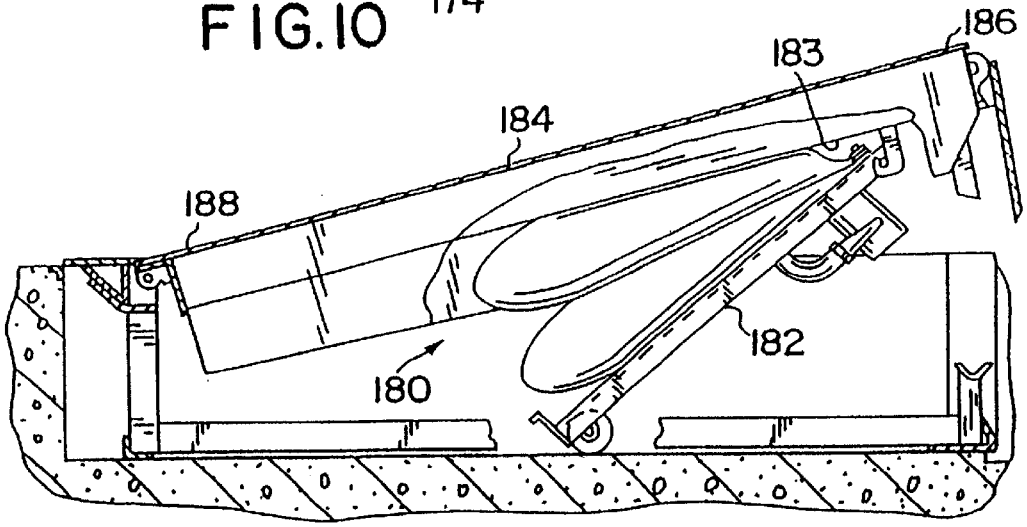

FIG. 11 illustrates yet another alternative embodiment of the lifting subassembly of the present invention. The lifting subassembly 180 illustrated in FIG. 11 is similar to that illustrated in FIG. 1, except that the intermediate member 182 (i.e., the bag support) is mounted to the beams 183 of the deck plate 184 near the outer end 186 of the deck plate 184, rather than near the inner end 188 of the deck plate 184 as illustrated in FIG. 1.

Figure 12:
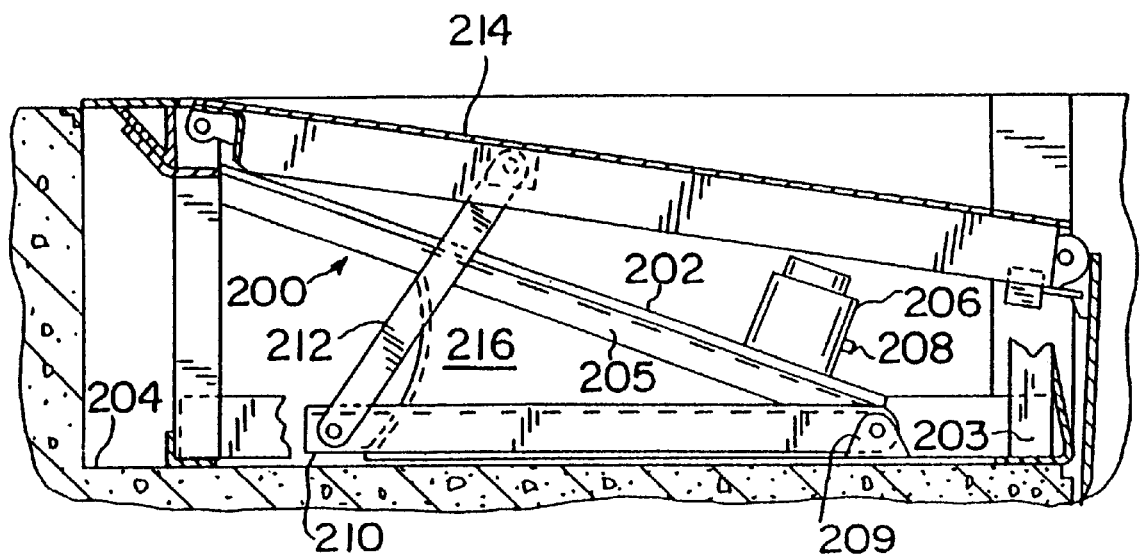
FIGS. 12–13 are longitudinal section views of a vacuum subassembly of the present invention.
Figure 13:
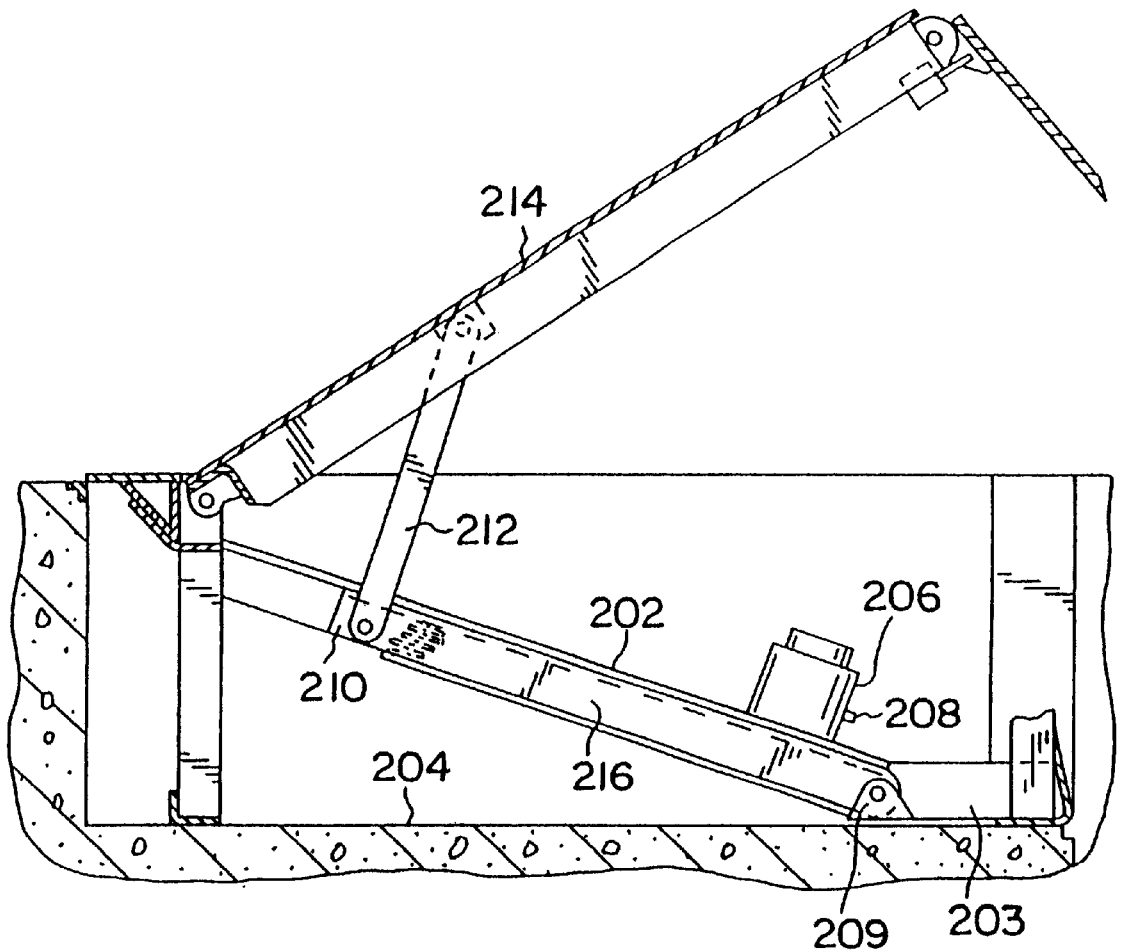

FIGS. 12 and 13 illustrate yet another alternative embodiment of the lifting subassembly of the present invention. The illustrated lifting subassembly is different from the previously-described lifting subassemblies in that, instead of utilizing a blower device to inflate a bag assembly to raise of the deck plate, the lifting subassembly illustrated in FIGS. 12 and 13 utilizes a vacuum to deflate a bag assembly to raise the deck plate. More specifically, the lifting subassembly 200 includes a vacuum support 202 rigidly secured to the subframe 203 which is supported by the dock floor 204. Side skirts 205 provide additional rigidity to the vacuum support 202. A vacuum device 206 is mounted to the vacuum support 202 and includes a vacuum discharge 208. The vacuum device 206 is identical to the previously-described blower device except that it is inverted. An intermediate member 210 is pivotally mounted to a bracket 209 secured to the subframe 203, and a linkage member 212 pivotally interconnects the intermediate member 210 to the deck plate 214. A bag assembly 216 interconnects and forms a sealed enclosure between the intermediate member 210 and the vacuum support 202.

In its resting condition, the lifting subassembly 200 is positioned as illustrated in Fig,. 12. In the resting condition, the intermediate member 210 is pivoted away from the vacuum support 202 such that a volume of air is present within the bag assembly 216. To raise the deck plate 214, the vacuum device 206 is turned on, causing air to be withdrawn from the bag assembly 216, thereby resulting in deflation of the bag assembly 216. The low pressure created within the bag assembly 216, in conjunction with the atmospheric pressure on the bag assembly and associated intermediate member 210, causes the intermediate member 210 to be drawn upward toward the vacuum support 202. Such movement can continue until the intermediate member 210 is positioned adjacent to the vacuum support 202, corresponding with the bag assembly 216 being deflated, as illustrated in FIG. 13. When the vacuum device 206 is turned off, the weight of the deck plate 214 will push down on the intermediate member 210. In this regard, air will be allowed to enter the bag assembly 216 in a controlled manner through the vacuum discharge 208. Such inflation of the bag assembly 216 corresponds with lowering of the deck plate 214.

It should be appreciated that the above-described lifting subassembly 200 could also function in the reversed position. That is, the vacuum support 202 could angle upwardly from the pit floor to the free end of the deck plate 214 (or associated beams) and the intermediate member 210 could be pivotally secured to the subframe 203 (or pit floor) near the rear of the pit.

Figure 14:
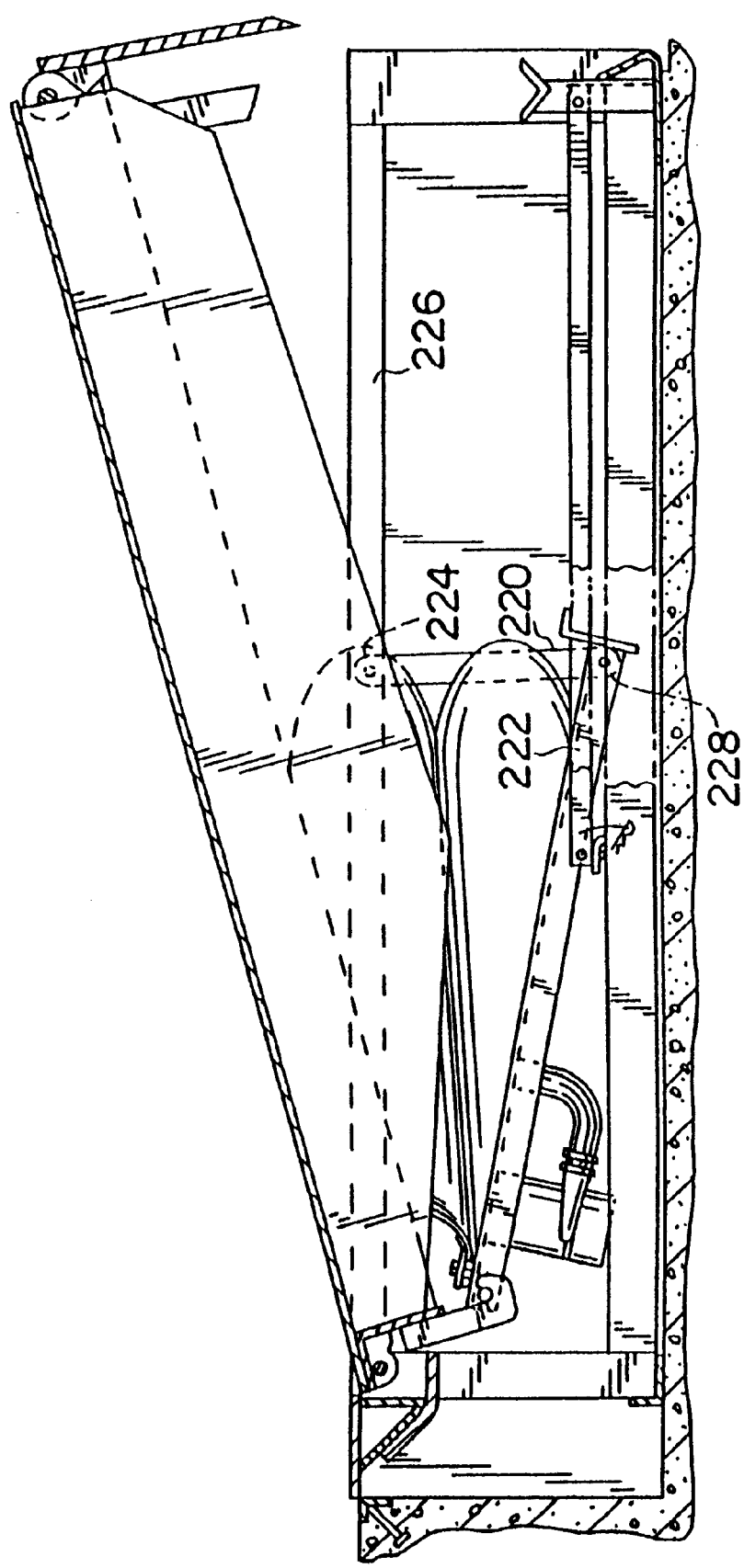
FIG. 14 is a longitudinal section view of an alternative embodiment of the present invention.

FIG. 14 illustrates another embodiment of the present invention that is very similar to the embodiment illustrated in FIG. 1 except that the wheels 82 have been removed and replaced with swing links 220 on either side of the intermediate member 222 (only one is shown in FIG. 14). One or more swing links 220 could be used. Each swing link 220 includes a first end 224 that is pivotally secured to the subframe 226 or equivalent rigid structure, and a second end 228 that is pivotally secured to the intermediate member 222. In this manner, the swing link 220 will accommodate lateral movement of the intermediate member 228 without the need for wheels. This embodiment is particularly advantageous when there is no pit floor.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

We claim:

1. A loading dock comprising:
    a dock surface including a pit having a back wall;
    a supporting structure positioned within the pit;
    a ramp pivotally coupled to the supporting structure at a location spaced from the back wall;
    an inflatable assembly positioned under the ramp and adapted to move the ramp between a lowered position and a raised position; and
    a support positioned under and supporting the inflatable assembly, the support being movably coupled to the ramp, wherein the support is in a first position when the ramp is in the lowered position and the support is in a second position when the ramp is in the raised position, the first position being different from the second position.

2. A loading dock as claimed in claim 1, wherein the supporting structure includes at least one substantially vertical member spaced from the back wall, the ramp being pivotally coupled to the substantially vertical member.

3. A loading dock as claimed in claim 1, wherein the inflatable assembly includes an inflatable bag.

4. A loading dock as claimed in claim 1, wherein the support is inclined.

5. A loading dock as claimed in claim 4, wherein the support is inclined at least 5 degrees relative to horizontal.

6. A loading dock as claimed in claim 4, wherein the support is inclined at least 10 degrees relative to horizontal.

7. A loading dock as claimed in claim 1, further comprising at least one dock level support movably coupled to the ramp and at least one support pad positioned under the dock level support and adapted to engage and support the dock level support.

8. A loading dock as claimed in claim 7, wherein the dock level support is pivotally coupled to the ramp.

9. A loading dock as claimed in claim 1, wherein the support is removably attached to one of the support structure and the ramp.

10. A loading dock as claimed in claim 1, wherein the first position is significantly different from the second position.

* * * * *